(12) United States Patent
Tremaine et al.

(10) Patent No.: US 8,555,234 B2
(45) Date of Patent: Oct. 8, 2013

(54) VERIFICATION OF SOFT ERROR RESILIENCE

(75) Inventors: Robert Brett Tremaine, Poughkeepsie, NY (US); Mark Anthony Check, Poughkeepsie, NY (US); Pia N Sanda, Poughkeepsie, NY (US); Prabhakar Nandavar Kudva, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/553,224

(22) Filed: Sep. 3, 2009

(65) Prior Publication Data

US 2011/0055777 A1 Mar. 3, 2011

(51) Int. Cl.
G06F 17/50 (2006.01)
(52) U.S. Cl.
USPC ........... 716/136; 716/100; 716/101; 716/106; 716/108
(58) Field of Classification Search
USPC .......................... 716/100–101, 106, 108, 136
See application file for complete search history.

(56) References Cited

U.S. PATENT DOCUMENTS

| | | | |
|---|---|---|---|
| 6,330,182 B1 * | 12/2001 | Zhang | 365/154 |
| 7,065,726 B1 | 6/2006 | Singhal et al. | |
| 7,072,818 B1 * | 7/2006 | Beardslee et al. | 703/14 |
| 7,200,543 B2 * | 4/2007 | Palladino | 703/14 |
| 7,644,311 B2 * | 1/2010 | Lien et al. | 714/37 |
| 7,937,679 B2 * | 5/2011 | Mariani | 716/104 |
| 2005/0010880 A1 * | 1/2005 | Schubert et al. | 716/4 |
| 2007/0094629 A1 * | 4/2007 | Alter et al. | 716/11 |
| 2007/0226572 A1 * | 9/2007 | Zhang et al. | 714/742 |
| 2007/0234125 A1 * | 10/2007 | Lien et al. | 714/37 |
| 2008/0077376 A1 * | 3/2008 | Belhaddad et al. | 703/13 |
| 2008/0216040 A1 * | 9/2008 | Furnish et al. | 716/10 |
| 2008/0276206 A1 * | 11/2008 | Mariani | 716/4 |
| 2008/0281572 A1 * | 11/2008 | Puri et al. | 703/16 |
| 2009/0230988 A1 * | 9/2009 | Nieuwland et al. | 326/9 |
| 2010/0083203 A1 * | 4/2010 | Bose et al. | 716/6 |
| 2010/0306720 A1 * | 12/2010 | Pikus et al. | 716/5 |

* cited by examiner

*Primary Examiner* — Stacy Whitmore
(74) *Attorney, Agent, or Firm* — Cantor Colburn LLP; John Campbell

(57) ABSTRACT

An efficient method for selecting a minimal and statistically relevant set of SER sensitive logic devices critical to the SER robustness for a design, through identification by device type, identification nomenclature, connectivity and context. The minimal set of devices comprise the set of fault injection test points using a conventional fault injection test verification environment to establish an SER induced failure rate a logic design. The selection method affords a design independent means to evaluate any design regardless of the origin, source language or documentation by working at the common logic device level "gate-level" netlist format for the design data. The selected set of devices is distilled from the design data by successively filtering the design through a series of heuristic rule-based device identifier computer programs that group and annotate the devices into specific database records. These records are then used to organize the fault injection device test set by test behavior and relevance.

20 Claims, 2 Drawing Sheets

VERIFICATION OF SOFT ERROR RESILIENCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a computer processing system for providing fault injection verification of soft error rate (SER) sensitive logic devices for a computer design, particularly to provide a rating of the logic devices for soft error resilience, and to an automated production of an integrated circuit design process for devices carried out by a computer, computer network or apparatus, particularly through a computer method for the execution of software for automated verification of soft error resilience of devices to be used in integrated circuits from logic design data for those integrated circuits.

2. Description of Background

Before our invention, the U.S. Pat. No. 7,065,726, entitled "System and method for guiding and optimizing formal verification for a circuit design", incorporated fully herein by reference, suggested a formal verification guidance method for circuit design which involves modifying an analysis region manually if verification of the circuit design being verified results in determination that the analysis region is not verified. The abstract of U.S. Pat. No. 7,065,726 said that: "The present invention is used for guiding formal verification of a circuit design in circuit simulation software to optimize the time required for verification of a circuit design. The invention modifies the analysis region being used for verification in order to optimize the time for verification. The invention allows for manual, semi-automatic, and automatic modification of the analysis region. The modification is done by either expanding or reducing the analysis region or by adding new rules as assumptions to the existing analysis region. The invention also uses the concept of an articulation point for modification of the analysis region. The modification of the analysis region is performed in a manner to optimize time and memory required for verification of the circuit design."

The improvement claimed in U.S. Pat. No. 7,065,726 was for a method for guiding formal verification for a circuit design in circuit simulation software to optimize the time required for verification of the circuit design, the method comprising the steps of:

a. identifying an analysis region for verifying the circuit design;

b. verifying the circuit design by applying formal verification over the analysis region;

c. manually modifying the analysis region if verification of the circuit design over the analysis region results in a determination that the analysis region is not verified including the steps of:

1. selecting a signal in the analysis region; and
2. adding a portion of the circuit design relating to the signal in the analysis region including adding an articulated fan-in driving the signal to the analysis region by identifying the articulated fan-in of the signal by traversing the circuit design backwards from the signal until a signal from the group consisting of primary inputs, storage elements and articulation points is encountered.

An automated production of computer chips with a design process carried out by a computer, computer network or apparatus, particularly through a computer method for the execution of software for automated verification of soft error resilience of devices to be used in integrated circuits from logic design data for those integrated circuits.

This patent illustrated a way to find state machines and FIFO (First In First Out) within general design data for purposes other than SER verification which tools can be used like those here described for state machine and FIFO. However the use of the tools in the suggested formal verification guidance method still involved modifying analysis regions manually.

SUMMARY OF THE INVENTION

An efficient method for selecting with a computer instead of manually a minimal and statistically relevant set of soft error rate (SER) sensitive logic devices critical to the SER robustness for a design, through identification by computer filtering device type, identification nomenclature, connectivity and context. The minimal set of devices comprise the set of fault injection test points using a conventional fault injection test verification environment to establish an SER induced failure rate a logic design. The selection method affords a design independent means to evaluate any design regardless of the origin, source language or documentation by working at the common logic device level "gate-level" netlist format for the design data. The selected set of devices is distilled from the design data by successively filtering the design through a series of heuristic rule-based device identifier computer program steps that group and annotate the devices into specific database records. These records are then used to organize the fault injection device test set by test behavior and relevance.

The "nomenclature" terminology used herein encompass all manner of nomenclature found in any netlist format (hierarchical or flat). The "connectivity" terminology used herein encompasses all device connectivity, including interconnection name, device functional description, and association across hierarchy within a single design data file or across multiple files. The "context" terminology used herein encompass all manner of the logic design or part thereof, intended use, behavior, or implementation technology.

System and computer program products are stored as tangible code information on "computer readable storage medium" which medium does not store "signals" corresponding to the above-summarized methods which are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which provides a method for fault injection verification as a computer process without manual intervention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example a computer processing system illustrating the low resource intensive method for identifying the devices most important to the SER merit, while

Figure 1:
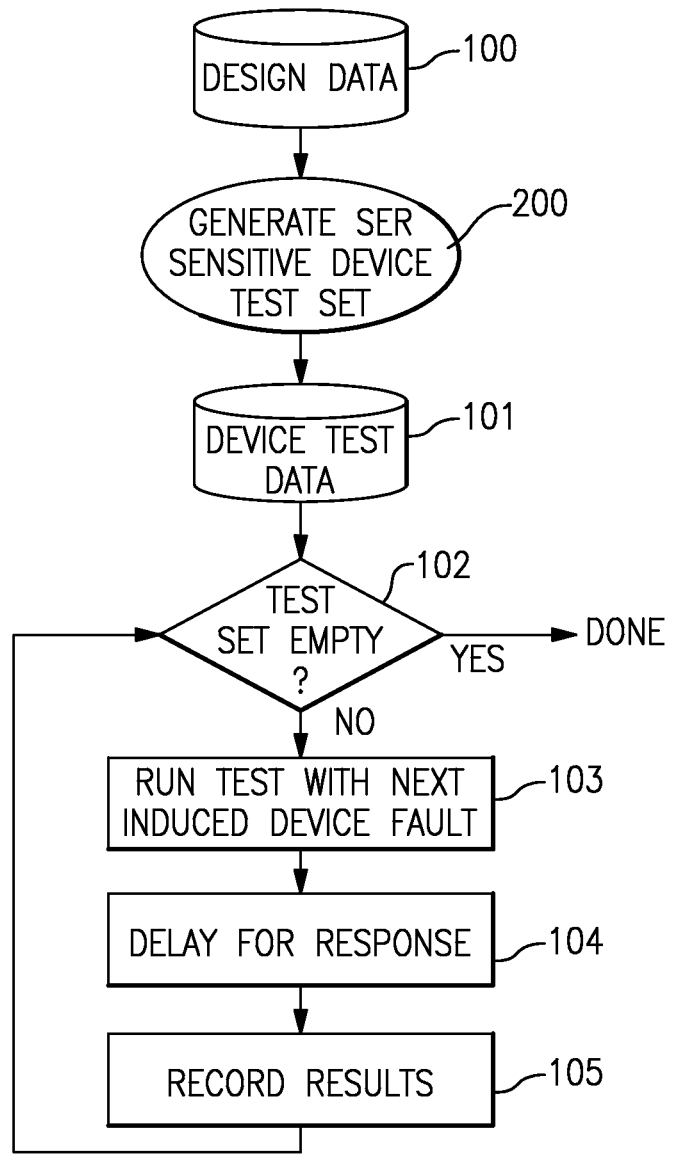

The detailed description explains the preferred embodiments of the invention, together with advantages and features, by way of example with reference to the drawings.

DETAILED DESCRIPTION OF THE INVENTION

There is the need to assess end-system soft error resilience characteristics (failure rates and logic upset fault tolerance) for data integrity and system reliability. Large system-on-chip designs and development cost pressures are driving more chip designs to incorporate "non-native" logic components from multiple sources, often from vendors or shared with other un-related chip development projects. Generally non-native logic has little design documentation about SER fault tolerance or behavior and does not have any special attributes or naming conventions to aid with SER design support or verification. Moreover, the non-native design is often not available with source design code description. Thus, identifying the sensitive devices (latches, register files, SRAM structures, and other circuits) and assessing their sensitivity using conventional techniques is not practical. For example, fault injecting all devices in the design is not feasible due the computational scale, and selecting a limited random sample for fault injection can yield to poor test coverage and imprecise failure rate figures when irrelevant devices are selected for fault testing. When identifying any fault injection test set to assess a design SER fault tolerance, it is important to avoid irrelevant devices, such as built-in self test, debug and trace logic, and any other functions not central to the design in the system application. In our computer system the identified and selected statistically relevant test set will include only devices with intrinsically high susceptibility to SER that are central to the data integrity and reliability of the system.

Our invention for identifying the minimal and statistically relevant set of SER sensitive logic devices for fault injection testing is underpinned by our new approach of not requiring prior design details and working at lowest level design data format, known as "gate-level" and common to the logic physical design process and common to all designs, and avoiding the conventional top-down approach that is inconsistent and often flawed as a non-complete problem. This is achieved by a computer implemented method for verification of soft error resilience of devices from logic design data, which entails: selecting a statistically relevant set of Soft Error Rate (SER) sensitive logic devices deemed critical to a SER robustness for a test process of logic design by using a SER categorization tool to generate a SER sensitive device test set as described with respect to the categorization tool shown in FIG. 2. Which this test set the process described in FIG. 1 can start a test process for a particular design, and based on the generated SER sensitive device test set and its organization and structure, can induce a logic state fault in successive ones of a design's devices in said test process for functional design verification, which test process provides a sufficient delay after injection for the logic design to detect or correct a logic fault for those design's devices in the test process. This method corrects the logic state fault which it determines needs to be corrected according to the logic design. As seen in the details of FIG. 2, our categorization tool incorporates a series of heuristic rule-based device identifier computer program steps that are used to distill device test sets by processing the design data files to identify, group and annotate the devices into specific database records. These records are then used to organize the fault injection device test set by test behavior and relevance.

Logic device context is central to the test set composition. For example, logic may be comprised of devices that not inherently sensitive to SER, but may be implemented in field programmable gate array (FPGA) technology that uses SER sensitive memory to implement the logic behavior. In this case, the fault testing must be expanded to include all devices that comprise the logic design function vs. the fewer device types that would need to be tested using an Application Specific Integrated Circuit (ASIC) or custom circuit technology. Other contextual attributes include device activity (inactive periods during clock gating or idle), integrated recovery by protocol or built-in error correction coding (ECC), or devices that are components to a common structure or bus (where only one bit needs to be tested of say a 512-bit wide bus).

Figure 2:
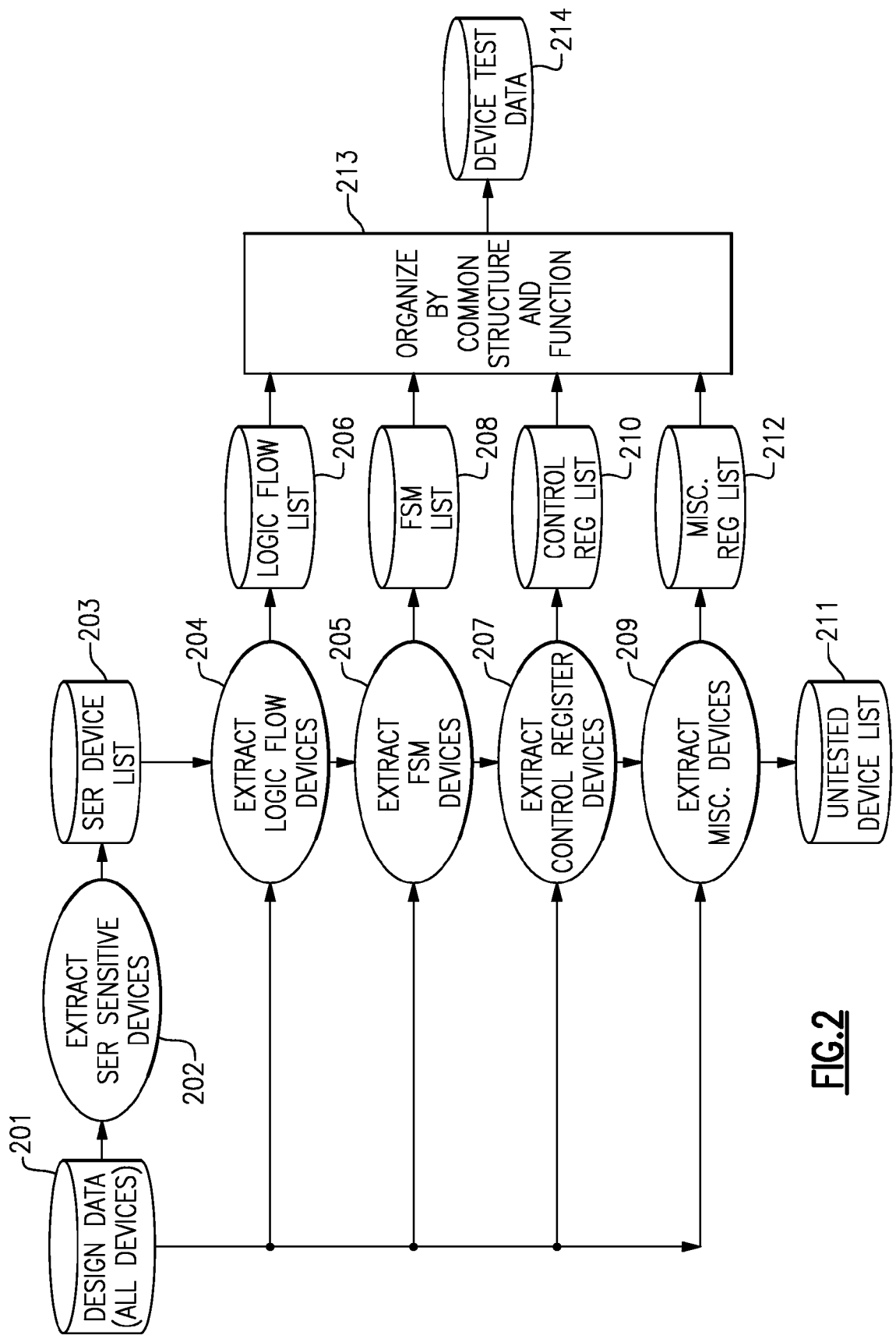
FIG. 2 illustrates one example of the categorization tool's program steps used for testing the design for SER robustness without the need of having other prior knowledge of the design details or embedded special SER attributes in the design which is employed in the method of FIG. 1 to generate a SER sensitive Device Test Set.

Referring to FIG. 1, a typical SER test methodology having a computer processing method for identifying and for testing the design for SER robustness. The computer processing method and system comprising a verification environment to establish an SER coverage metric for a logic design without any need for the verification computation intensive, labor intensive and design detail. This method of SER analysis which is illustrated for the logic design applies to any logic representation including FPGA, ASIC, custom circuit technology or technology independent logic descriptions that are intended to be later mapped to a technology. The computer processing system having memory (illustrated by the disk storage) and processing facilities for processing data (such as comparator 102) with a computer program for analysis of failure rates of devices from said design data, and the system is provided with a fault injection and exercising environment for inducing faults in devices from said design data (illustrated for the Run Test 103). Conventional verification fault injection practices are used to test each device from the test set to determine if the events are undetected by the design itself, detected by the behavior of the device (output and/or memory state corrupted/responsive or the test hangs), or if the event goes undetected in anyway. These behaviors are then mathematically assessed to evaluate the integrity of the design with respect to the device test set.

The identifying step 200 is typically performed as design engineer interrogation and the manual review of the design specifications and source-code level logic description to define the set of devices for test 101. FIG. 2 illustrates our invention for the identification step 200 provides a automated SER identification computer program which we call a categorization tool to generate as a Design Test Set 214 used as the test set 101 without the need of having other prior knowledge of the design details, design engineers, or embedded special SER attributes in the design. Overall the system of FIGS. 1 and 2 illustrate use of a computer program for analysis of failure rates of devices from design data being stored in memory of the computer processing system and upon exercise of said fault injection and exercising environment for said design data provides a Soft Error Rate (SER) rate value (out of 102) for devices of design data for verification of soft error resilience of the devices from design data. This method uses a computer processing system, logic design data and provides a verification environment to establish a software error rate (SER) for a logic design independent (without the verification computation intensive, labor intensive and design detail) method to evaluate any design regardless of the origin, source language or documentation by working at the common "gate-level" netlist format for the design data. For convenience, we use the failure in time (FIT) metric (failures per one billion ($10^9$) device-hours of operation), but those familiar with error rate analysis should understand that the software error rate applies to any representation of error rate units, including but not limited to FIT. By establishing the data in the process here one does not have to be concerned with the source data's integrity. Generally non-native design logic (vendor sourced) may have little design documentation about SER design robustness and does not have any special attributes or naming conventions to aid with SER design support or verification, yet with the process here using the design data each needed design device can be verified with the needed SER data and can be used.

The method of FIG. 2 provides design independent program steps for extracting a set of SER sensitive devices from the logic design representation without prior knowledge of the logic design regardless of origin, source language or documentation and without manual intervention which we regard as our categorization tool. A key aspect of the method has the target design data representation 201 at the common "gate-level" netlist format. This format is the most consistent, common and portable format, is represented at the logic device level, and is or can be mapped to a technology specific library. However, counter intuitively, this preferred representation is the least understandable to a human and contains little or no descriptive detail, but is well suited to our automated pattern detection method. We use a set of heuristic rules applied in program stages 202 to identify a test set of SER sensitive devices and then to extract specific statistically relevant devices according to nomenclature and connectivity, 204, 205, 207, 209 according to rules applied to create an organized by structure and function set for Design Test Data 214 used in the process of FIG. 1. These rules are comprised of general pre-defined rules with both pre-defined lists and parameters and user defined lists and parameters, as well as user defined rules. Each stage represents a computer program step optimized to parse, select, and output to the next stage and to a file 206, 208, 210, 212 a set of devices based on a specific set of rules and parameters targeted to device characteristics, connectivity and nomenclature identifying the devices in a design most important to the SER merit. Having multiple stages facilitates organizing the device test set by design structural component 213 and output to a file or database 214 to define the test generation and expect 103, 104, 105.

The first stage 202 reads the netlist 201 for the instance names of devices that belong to the list of predetermined SER sensitive device types, performing the extraction according the design data and logs the result as a "statistically relevant SER sensitive device" list stored at 203. For example, the set of flip-flops, latches, and memories contained within the design. This data is used by the next stage to direct the search to identify and log 206 the devices that comprise the "flow" within the design. These devices represent the majority of the devices in a design and are generally structured into vectors that can reduced to scalers for minimal test time. Rules for the search are constructed from defined commands that can be chained together with logical operators and nomenclature parameters from lists of predefined and user defined lists of character strings, delimiters, and prefix or suffix parameters commonly used in designs and commonly created by design and synthesis, including: "_d", "_dp", "data", "addr", "address", "_p", "_a", "_ap", "_ecc", "trace", "mem", etc. This stage also groups detected into probable common vectors by comparing common instance name, hierarchy and numerical sequence prefix and suffixes. At this stage and each subsequent stage, the user can review the output file to assess the results and choose to refine the parametric lists and rules used to achieve desired results for the specific design. For example the user may choose to keep dataflow with suffix "dat" and drop debug flow with string "trace" OR "debug" from the list of selected devices.

Similarly, subsequent stages 204, 205, 207, 209 specific rules and parameter lists are employed to select, group and associate into related vectors devices with the desires attributes, including Finite State Machines (FSMs), control registers and other desired devices groups. After all the filtering stages the remaining devices 211 are logged. The user assesses this list to determine if and how the prior parameter lists may be refined to include any devices that should have been retained in prior stages. Generally, those devices left in the untested list 211 are logic devices that are not statistically relevant to the design SER. For example, such devices comprise debug, trace and self test circuits and in some cases redundant logic.

Rules are constructed for supported commands to aid in parsing the netlist and organizing the results. Key commands include but are not limited to:
Keep: Log devices with specified parameters
Drop: Do not log devices with specified parameters
Endpoint: Parse endpoints for devices in list
Startpoint: Parse startpoints for devices in list
Group: Attach attribute to devices in a list
Addgroup: Add a device to a specified group
Deletegroup: Remove a device from a specified group
Logic operators can be used with commands to construct specific rules, including: OR, AND, NOT, CONCATINATE.

Device Test Data 214 is stored and used as Device Test Data 101 in the process illustrated in FIG. 1 is now analyzed. First, this data 101 is queried: "Is the test set empty?" "No" is the first result at the output of the Test Set Empty step 102 comparator. If the comparator 102 output is No, then Step 103 of the process runs its test with a next induced device fault at step 103 for inducing a logic state fault in the current one of said devices in the context of a functional design verification beginning with the first identified device in the SER Device Test Data 214 at illustrated stored in step 101. The behavior of the logic state fault of a device can be recorded and the record used as feedback in the process of extracting SER sensitive devices in step 202 illustrated in FIG. 2 to feedback the recorded behavior to this select extraction step 202 to further refine said set of SER devices.

A Design Data Delay 104 is created having a sufficient delay after injection for the design to detect or correct the logic fault induced in step 103. The results are recorded at 105, and there is a loop return to the comparator test set empty 102. So long as the answer is No the iterative examination of the SER Device Test Data 214 continues and step 103 repeats the induce logic state fault step on next of a plurality of devices in the device test data used to define a statistically relevant sampling to establish test generated SER that approximates the actual SER for the logic hardware. The test is run with the next induced device fault, results are recorded and the loop check of the test data 214 continues. However, when the answer to "Test set Empty?" is "Yes", a final process calculates the actual SER rate for the fault-injection SER verification process of FIG. 1.

FIG. 2 illustrates the SER categorization tool for our system and method for categorizing types of SER-sensitive devices. As input to the categorization tool the Design Data of FIG. 1, step 100, containing a set of unidentified devices to be verified with the program procedure for identified design data 100 is provided. Then in step 2 this data for all devices 201 is routed to extract SER sensitive devices 202 having SER-sensitive characteristics of the Design Data to produce a log of statistically relevant SER sensitive devices as we illustrate in FIG. 2 by incrementally stepping towards the design data refined list of SER sensitive devices 201, performing the extraction according the design data and storing the result as a "statistically relevant SER sensitive device" list 203. To achieve the statistically relevant SER sensitive device list 203, for each SER Device of the statistically relevant SER Sensitive Device List 203, a subsequent heuristic examination is performed based on the device's nomenclature and connectivity. All extractions in the process of FIG. 2 use the heuristic rules and device nomenclature and connectivity extraction steps 204, 205, 207, 209. After the Extract Logic Flow Devices extraction of step 204, the extraction is stored as a list at step 206, while the SER device list 201 is again examined at step 205. At this next successive stage 205 of the process, another alternative extraction is used to select FSM devices which are stored as a list at step 208. Similarly next there is extraction of control register devices at step 207 which are stored at step 210, and the process continues to extract miscellaneous devices at step 209 which are stored at step 212 or passed on as an untested device list stored at step 212. These successive stages of the process prepare lists to be used in the next step 213 of the process, the organization of the devices by common structure and function to organize devices in step 213 by characteristic identification and by nomenclature and connectivity into groups for the purpose of managing error injection for said group of devices identified in the resulting stored Device Test Data 214. The extraction process in steps 204, 205, 206, 207, assigns a value weighting attribute for specific device characteristics for devices on the SER Sensitive Device list 203 to determine when to test and how to include the test result in the SER rate that approximates the actual SER rate for the chip design logic in a hardware implementation using devices in said device test data. Inducing as described with respect to FIG. 1 a logic state fault in successive ones of said devices is repeated for a sufficient plurality of devices to define a statistically relevant sampling to establish a test SER rate that approximates the actual SER rate for the chip design logic in a hardware implementation using devices in said device test data.

This value weighting attribute is used in step 213 to organize devices according to value weighting. As this organization completes at step 213, the output is the Device Test Data 214 which is tested after being stored as Device Test Data 101, as described with respect to FIG. 1.

The test sets constructed in the method of FIG. 2 are used in the method of FIG. 1 which test injects faults into the devices utilizing the appropriate tests. When the devices are exhausted the verification exercise is complete. Feedback from the verification exercise can be entered as a refinement of the test sets and/or the test definition.

In FIG. 2, aspects of a netlist are used. Nomenclature includes hierarchy while connectivity knowledge allows the reduction using the symmetry of structures that are identical or similar and are joined to a common structure or bus. This process can be embodied as a computer program stored as tangible code information on "computer readable storage medium" on at least one program storage device readable by a machine, tangibly embodying at least one program of instructions executable by the machine to perform the capabilities of the present invention and can be provided as a computer program product which is an embodiment of our invention stored on a memory device of a computer processing system as a tangible embodiment of information.

The flow diagrams depicted herein are just examples. There may be many variations to these diagrams or the steps (or operations) described therein without departing from the spirit of the invention. For instance, the steps may be performed in a differing order, or steps may be added, deleted or modified according to the order of importance of the heuristic steps. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for verification of soft error resilience of devices from design data for a logic design, comprising:
   selecting a statistically relevant set of Soft Error Rate (SER) sensitive logic devices deemed critical to a SER robustness for a test process of the logic design by using a SER categorization tool to generate a SER sensitive device test set, and further comprising:
      successively filtering the design data through a series of heuristic rule-based device identifiers that group and annotate the SER sensitive logic devices by parsing a netlist representing the logic design for identification nomenclature, device type and connectivity;
      selecting, grouping, and associating related devices for testing according to a list of predetermined SER sensitive device types; and
      reducing a number of the devices in the SER sensitive device test set based on symmetry of structures joined to a common bus and further reducing flow device vectors to scalars; and
   inducing a logic state fault in successive ones of said reduced number of devices in said test process of the logic design for functional design verification which provides a sufficient delay after injection for the logic design to detect a logic fault for those reduced number of devices in said test process; and
   providing logic fault information of said detected logic fault of said reduced number of devices to facilitate corrective action.

2. The method according to claim 1 wherein said inducing of a logic state fault in successive ones of said reduced number of devices is repeated for a sufficient plurality of devices to define a statistically relevant sampling to establish a test SER rate that approximates the actual SER rate for the chip design logic in a hardware implementation using devices in said device test data.

3. The method according to claim 1 wherein design data for a device to be tested with an induced logic state fault is assigned a value weighting attribute for the specific device characteristics of the device to determine when to test the device and how to include the test result in the SER rate.

4. The method according to claim 3, wherein the assigned value weighting attribute is used to organize devices by common structure and function for device test data used in said test process according to said value weighting.

5. The method according to claim 1 wherein selecting a statistically relevant set of Soft Error Rate (SER) sensitive logic devices deemed critical to a SER robustness for a test process of logic design uses feedback of behavior of devices to further refine a set of SER devices for said test process.

6. The method according to claim 1 further comprising: performing heuristic examination based on the identification nomenclature and the connectivity to extract and store device lists, the device lists including one or more of: a logic flow list, a finite state machine list, a control register list, and an untested device list.

7. The method according to claim 6 wherein said identification nomenclature comprises an instance identified name, a name fragment and a hierarchical positional identifier.

8. The method according to claim 6 wherein said logic devices are defined in a library of devices for a specific technology.

9. The method according to claim 6 wherein said connectivity determines how a device is connected to other devices, the network connection identification, and the number and type of connections to be employed on the device.

10. The method according to claim 1 wherein there is selection from a Soft Error Rate (SER) device list a set of statistically relevant SER sensitive devices deemed critical to SER robustness for a test process of said logic design while using said programmed SER categorization tool to extract SER sensitive devices from said SER device list according to said logic design and then generating the SER sensitive device test set organized by common structure and function.

11. A computer program product stored on a memory device of a computer processing system as a tangible embodiment of information comprising instructions for execution by the computer processing system to perform a method for automated verification of soft error resilience of devices from design data for a logic design, the method comprising:
selecting a statistically relevant set of Soft Error Rate (SER) sensitive logic devices deemed critical to a SER robustness for a test process of the logic design by using a SER categorization tool to generate a SER sensitive device test set, and further comprising:
successively filtering the design data through a series of heuristic rule-based device identifiers that group and annotate the SER sensitive logic devices by parsing a netlist representing the logic design for identification nomenclature, device type and connectivity;
selecting, grouping, and associating related devices for testing according to a list of predetermined SER sensitive device types; and
reducing a number of the devices in the SER sensitive device test set based on symmetry of structures joined to a common bus and further reducing flow device vectors to scalars;
inducing a logic state fault in successive ones of said reduced number of devices in said test process of the logic design for functional design verification which provides a sufficient delay after injection for the logic design to detect a logic fault for those reduced number of devices in said test process; and
providing logic fault information of said detected logic fault of said reduced number of devices to facilitate corrective action.

12. The computer program product according to claim 11 further comprising stored on a memory device of a computer processing system as a tangible embodiment of information, soft error rate failure in time rate values for said logic devices obtained after verification of soft error resilience of said logic devices from design data.

13. The computer program product according to claim 11 further comprising:
performing heuristic examination based on the identification nomenclature and the connectivity to extract and store device lists, the device lists including one or more of: a logic flow list, a finite state machine list, a control register list, and an untested device list.

14. A system for verification of soft error resilience of devices from design data for a logic design, comprising:
a computer processing system having memory and processing facilities for processing data with a computer program for analysis of failure rates of devices from said design data;
a fault injection and exercising environment for inducing faults in devices from said design data; and
said computer program for analysis of failure rates of devices from said design data being stored in said memory of said computer processing system and upon execution of said computer program and exercise of said fault injection and exercising environment for said design data, said computer program provides a Soft Error Rate (SER) rate value for devices of said design data for verification of soft error resilience of the devices from said design data, and further provides selection of a statistically relevant set of SER sensitive logic devices from the design data for the analysis, the statistically relevant set of SER sensitive logic devices formed by successively filtering the design data through a series of heuristic rule-based device identifiers that group and annotate the SER sensitive logic devices by parsing a netlist representing the logic design for identification nomenclature, device type and connectivity, and selects, groups and associates related devices for testing according to a list of predetermined SER sensitive device types, and reduces a number of the devices in the SER sensitive device test set based on symmetry of structures joined to a common bus and further reduces flow device vectors to scalars.

15. The system according to claim 14 wherein said inducing of a logic state fault in successive ones of said devices is repeated for a sufficient plurality of devices to define a statistically relevant sampling to establish a SER rate that approximates the actual SER rate for the design logic in a hardware implementation using devices in said device test data.

16. The system according to claim 14 wherein design data for a device to be tested with an induced logic state fault is assigned a value weighting attribute for the specific device characteristics of the device to determine when to test the device and how to include the test result in the SER rate.

17. The system according to claim 16, wherein the assigned value weighting attribute is used to organize devices by common structure and function for device test data used in said test process according to said value weighting.

18. The system according to claim 14 wherein selecting a statistically relevant set of Soft Error Rate (SER) sensitive logic devices deemed critical to a SER robustness for a test process of logic design uses feedback of behavior of devices to further refine a set of SER devices for said test process.

19. The system according to claim 18 further comprising:
performing heuristic examination based on the identification nomenclature and the connectivity to extract and store device lists, the device lists including one or more of: a logic flow list, a finite state machine list, a control register list, and an untested device list.

20. The system according to claim 18 wherein selection of a statistically relevant set of SER devices is based on parsing the netlist for logic vector width and size using numeric prefixes and suffixes in selection for the test set.

* * * * *